US005558947A

United States Patent [19]

Robison

[11] Patent Number: 5,558,947
[45] Date of Patent: Sep. 24, 1996

[54] RECHARGEABLE BATTERY SYSTEM AND METHOD AND METAL-AIR ELECTROCHEMICAL CELL FOR USE THEREIN

[76] Inventor: George D. Robison, 840 W. Paces Ferry Rd., Atlanta, Ga. 30327

[21] Appl. No.: 422,450

[22] Filed: Apr. 14, 1995

[51] Int. Cl.[6] .................................................. H01M 8/06
[52] U.S. Cl. ........................... 429/13; 429/14; 429/15; 429/17; 429/19; 429/49; 429/50; 429/51
[58] Field of Search ............................... 429/13, 14, 15, 429/17, 19, 49, 50, 51

[56] References Cited

U.S. PATENT DOCUMENTS

| | | |
|---|---|---|
| 3,359,136 | 12/1967 | Merten et al. |
| 3,457,113 | 7/1969 | Deibert. |
| 3,457,115 | 7/1969 | Kent. |
| 3,556,854 | 1/1971 | Wheadon et al. |
| 3,556,856 | 1/1971 | Elbert. |
| 3,556,862 | 1/1971 | Fox. |
| 4,115,628 | 9/1978 | Bonnemay et al. ...................... 429/44 |
| 4,126,733 | 11/1978 | Doniat ...................................... 429/12 |
| 4,147,839 | 4/1979 | Solomon et al. ........................ 429/15 |
| 4,159,367 | 6/1979 | Berchielli et al. ...................... 429/38 |
| 4,248,682 | 2/1981 | Lindstrom et al. .................... 204/114 |
| 4,354,917 | 10/1982 | Solomon ............................... 204/284 |
| 4,476,002 | 10/1984 | Howard et al. ....................... 204/283 |
| 4,491,624 | 1/1985 | Sarbacher et al. ..................... 429/27 |
| 4,514,474 | 4/1985 | Momyer et al. ........................ 429/27 |
| 4,572,876 | 2/1986 | Spurrier .................................. 429/34 |
| 4,719,156 | 6/1988 | Niksa et al. ............................ 429/14 |
| 4,743,518 | 5/1988 | Romanowski ........................ 429/34 |
| 4,788,111 | 11/1988 | Niksa et al. ............................ 429/27 |
| 4,788,114 | 11/1988 | Rothman .............................. 429/217 |
| 4,814,240 | 3/1989 | Zaromb ................................... 429/15 |
| 4,842,963 | 6/1989 | Ross, Jr. ............................... 429/105 |
| 4,863,813 | 9/1989 | Dyer ...................................... 429/33 |
| 4,885,217 | 12/1989 | Hoge ...................................... 429/27 |
| 4,908,281 | 3/1990 | O'Callaghan ......................... 429/27 |
| 4,925,744 | 5/1990 | Niksa et al. ............................ 429/27 |
| 4,950,561 | 8/1990 | Niksa et al. ............................ 429/27 |
| 4,957,826 | 9/1990 | Cheiky .................................. 429/27 |
| 5,006,424 | 4/1991 | Evans et al. ........................... 429/15 |
| 5,032,473 | 7/1991 | Hoge ...................................... 429/42 |
| 5,094,928 | 3/1992 | Dyer ...................................... 429/33 |
| 5,171,646 | 12/1992 | Rohr ...................................... 429/34 |
| 5,206,096 | 4/1993 | Goldstein et al. .................... 429/27 |
| 5,318,861 | 6/1994 | Harats et al. ......................... 429/21 |

OTHER PUBLICATIONS

"A New Zinc-Air Fuel Battery System" Hideo Baba Research Center, Sony Corp., pp. 930-936, No. 710237 (Month N/A, 1971).
"Power Sources for Electric Vehicles" B. D. McNicol, Studies... Electronic Engineering II, ELSEVIER, 1984, pp. 583-587 (Month N/A).

Primary Examiner—Prince Willis, Jr.
Assistant Examiner—M. Nuzzolillo
Attorney, Agent, or Firm—Hopkins & Thomas

[57] ABSTRACT

Rechargeable metal-air battery systems comprise a plurality of plate groups (40) disposed within a battery cell (12) and have input and output conduits (13, 14). A fluid electrolyte is circulated through the battery cell by a pump (22) and regenerated by a divester (20) for recirculation through the battery cell (12). The divester (20) divests the particles of active material suspended within the electrolyte of their oxide layer resulting from passivation caused by the electrolyte solution being saturated with oxide. The divester (20) performs its function by bringing the particles of active material into frictional contact with one another. The battery system (10) constructed in accordance with the present invention may be chemically recharged by removing the spent active material suspended within the electrolyte and replacing it with new active material.

19 Claims, 8 Drawing Sheets

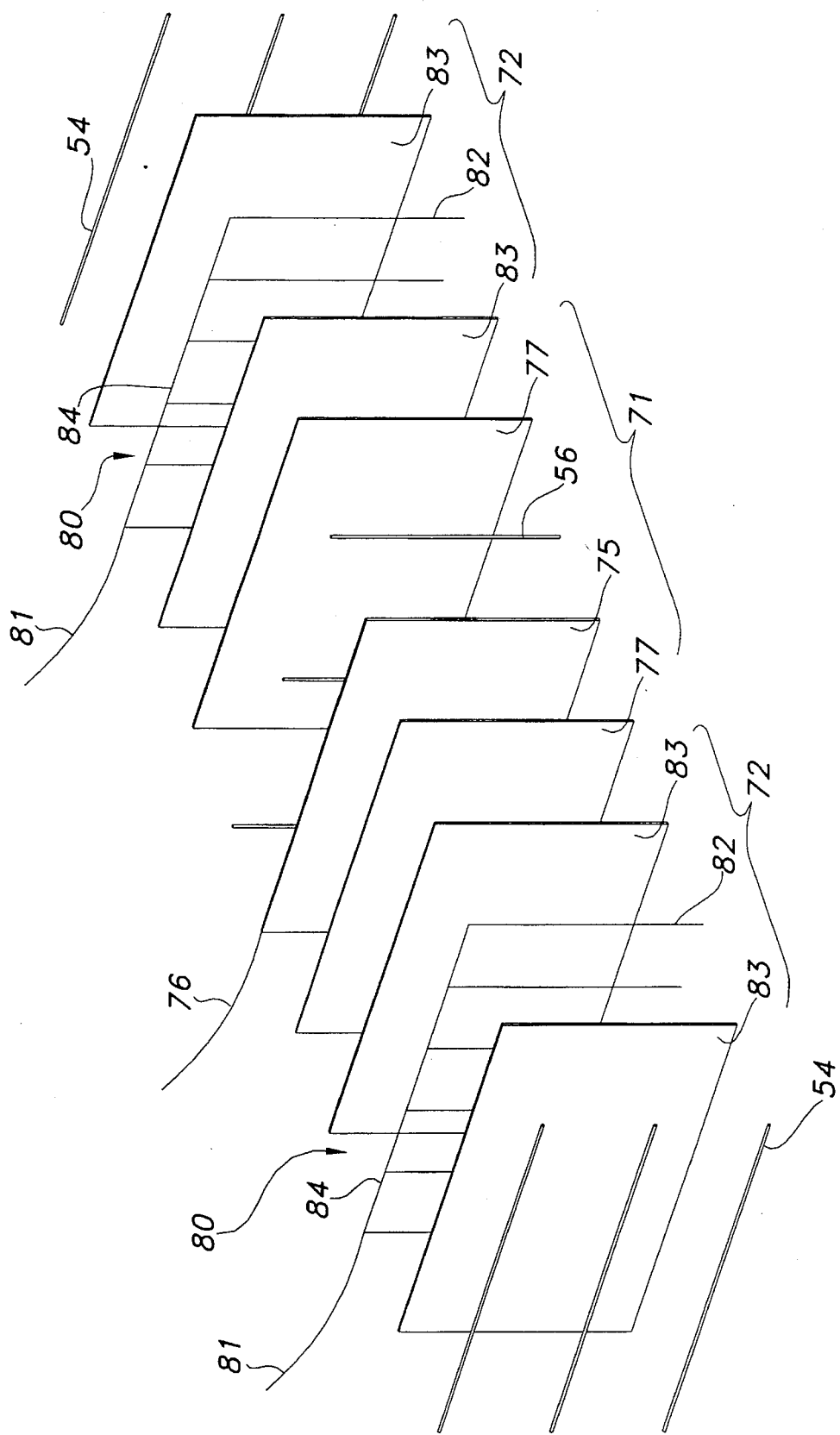

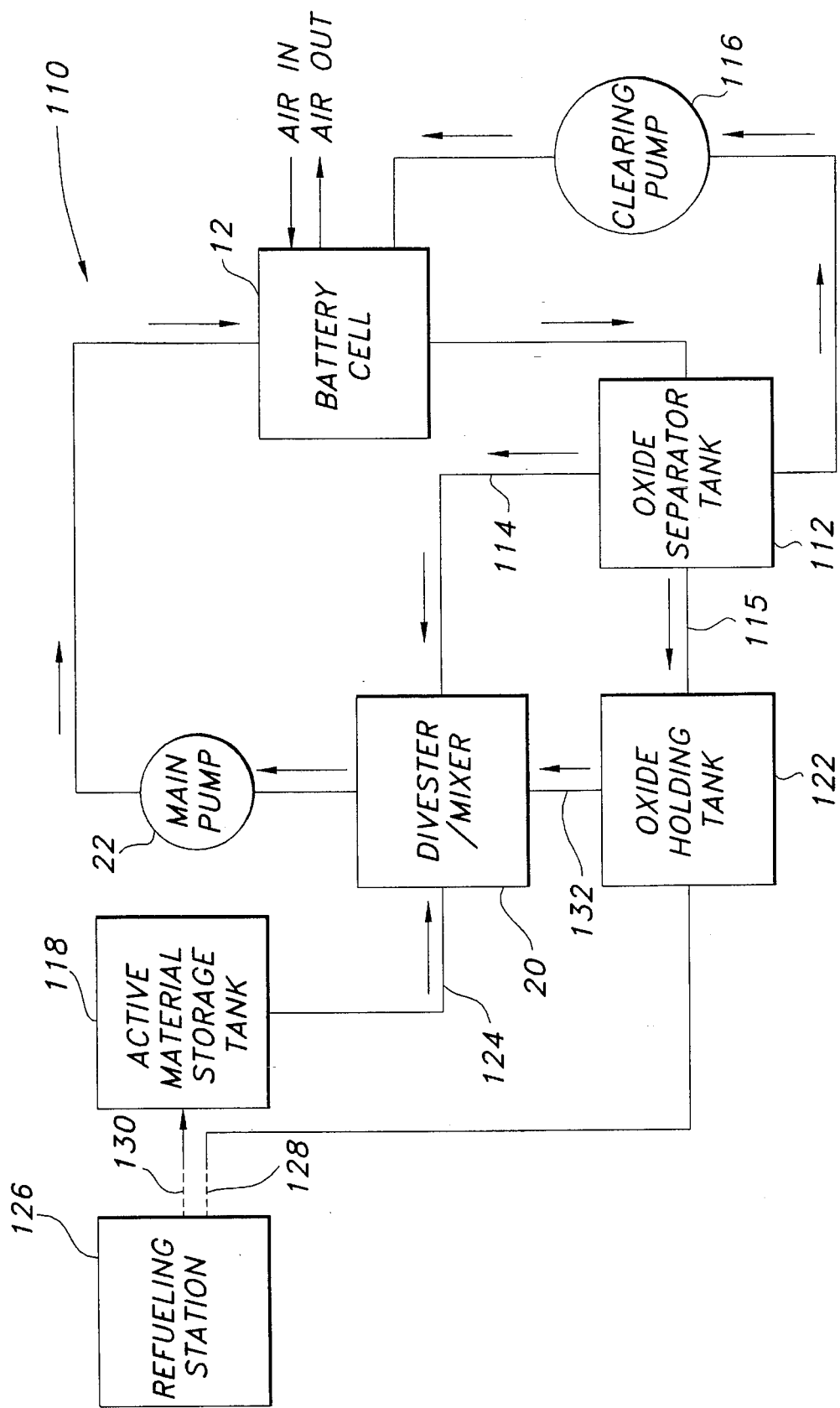

RECHARGEABLE BATTERY SYSTEM AND METHOD AND METAL-AIR ELECTROCHEMICAL CELL FOR USE THEREIN

FIELD OF THE INVENTION

The present invention generally relates to a rechargeable battery system, and more particularly, to a rechargeable battery system and method and metal-air electrochemical cell which utilizes active particles that are regenerated during operation.

BACKGROUND OF THE INVENTION

Electric automobiles have long been an item of novelty and an object of curious inquiry to the everyday commuter. However, it appears with the earth's depleting supply of petroleum fuel and society's ever increasing awareness of the degenerative effect of the pollutants emitted in the exhaust of an automobile powered by a petroleum based fuel upon the environment, electric automobiles have recently become the object of intense research and development in an effort to produce a economically viable mass production electric automobile. The recently heightened interest in electric automobiles is due in large part to the zero emission vehicle laws recently passed in several states, including California, which have set minimum electrical car sales figures per year in those states for the car manufacturers to meet based upon a percentage of their total yearly sales in that state. Most of these laws are to take effect in 1998 or soon thereafter. In the race to produce such an electric automobile, the weakest link to date has been the absence of a rechargeable power source, i.e. battery, capable of producing the specific power (watts per pound) required to achieve an adequate cruising speed and the specific energy (watt hours per pound) required for a minimum 200 mile travel range. In addition, to be commercial viable, the power source must meet two other requirements, specific cost and safety of operation. Specific cost is merely an expression of the battery cost per pound which is an indicator of the cost of owning and operating the battery.

To better understand the operating requirements on a battery used to power an electric automobile, a general model for specific cruising power and specific cruising energy per mile has been developed to project the specific power and specific energy typically needed to produce a minimum 200 mile range in an electric road vehicle.

For the general model, six speed ranges are used, five of which cover a certain type of road use and a fifth which covers non-useful road operations such as heavy construction equipment. The lower speed range, less than 25 mph, is used to define the lowest limit for the specific energy and power requirements. These speed ranges, designated M, S, H, C, E, and F, am shown below along with a brief description of their operation.

| WORLD VEHICLE MARKET | | |
|---|---|---|
| PERFORMANCE RANGES: | | OPERATION DESCRIPTION: |
| (M) Material handling | under 25 mph | no useful road operation |
| (S) Secondary road | 25–45 mph | low speed road operation |
| (H) Highway | 45–55 mph | general highway travel |
| (C) City expressway | 55–65 mph | urban expressway travel |
| (E) Expressway | 65–75 mph | expressway travel |
| (F) Fast expressway | over 75 mph | long distance expressway travel |

Next, road vehicles are divided into four design groups designated N, A, U, and T. The main characteristics of each group are identified and listed below in order of increasing ratios of power system weight to total weight. The greater ratios of power system weight to total weight will result in less specific power and specific energy requirements from a battery at the expense of passenger and cargo space.

VEHICLE DESIGN TYPES:

(N) Normal road design—25% to 35% power system weight
  a. Front and back seat
  b. Good trunk space
  c. Standard suspension and tires
(A) Altered road design—35% to 55% power system weight
  a. Limited or absent back seat
  b. Limited trunk space
  c. Tire upgrade, suspension upgrade
  d. Slight redesign of body
(U) Unusual road design—55% to 75% power system weight
  a. Limited front seat space no backseat
    1. Two adult spaces
    2. Limited or absent cargo space
  b. Custom suspension
  c. Special high strength material body design
(T) Traction limit—over 75% power system weight
  a. One seat or no seat (driver may stand)
  b. Rack to carry cargo
  c. No external body (frame is body)
  d. No suspension, solid tires In analyzing the specific power and specific energy requirements for road operation, the six performance ranges and four design types are combined to give the following twenty-four design and performance combinations for analysis. These combinations are:

| Nominal Percentage of Battery Weight | | | | 200 Mile |
|---|---|---|---|---|
| 75% | 55% | 35% | 25% | Cruising Speed (mph) |
| MT | MU | MA | MN | under 25 |
| ST | SU | SA | SN | 25–45 |
| HT | HU | HA | HN | 45–55 |
| CT | CU | CA | CN | 55–65 |
| ET | EU | EA | EN | 65–75 |
| FT | FU | FA | FN | 75+ |

The specific power and specific energy requirements for twenty of these combinations, which represent cruising speeds of 25 mph or greater, are listed below in order of decreasing specific power.

| COMBINATIONS ACCORDING TO POWER REQUIREMENTS | | |
|---|---|---|
| | Cruise watts per lb (specific power) | Cruise watthours per lb (specific energy) |
| FN | 39.68 | 105.84 |
| FA | 28.34 | 75.60 |
| EN | 28.18 | 86.73 |
| EA | 20.13 | 61.95 |
| CN | 19.34 | 70.35 |
| FU | 18.03 | 48.11 |
| CA | 13.81 | 50.25 |

-continued

| COMBINATIONS ACCORDING TO POWER REQUIREMENTS | | |
|---|---|---|
| | Cruise watts per lb (specific power) | Cruise watthours per lb (specific energy) |
| FT | 13.23 | 39.42 |
| EU | 12.81 | 39.42 |
| HN | 12.75 | 56.70 |
| ET | 9.39 | 28.91 |
| HA | 9.11 | 40.50 |
| CU | 8.79 | 31.98 |
| CT | 6.45 | 23.45 |
| HU | 5.80 | 25.77 |
| SN | 4.70 | 37.58 |
| HT | 4.25 | 18.90 |
| SA | 3.35 | 26.85 |
| SU | 2.13 | 17.08 |
| ST | 1.57 | 12.53 |

Of the six speed ranges, only the City expressway, Expressway and Fast expressway speed specifications meet the performance levels of typical road vehicles. Of the four design types, only the Normal road design and Altered road design specifications offer the customary passenger and cargo space of most road vehicles.

In addition to the general mass road market, there are a number of limited use specialty road markets which use fairly low speeds. Some examples are delivery services and busses which operate at speeds of 45 mph or less. Batteries which don't meet at least the City expressway/Altered road design (CA) specifications for specific power and specific energy may still find wide use in these specialty markets.

The remaining combinations are not typically found in road service because they represent very unusual vehicle design types which have extremely limited cargo and passenger space or very low cruising speeds. Still, some combinations could be useful in small niche markets. For example, the Fast expressway/Unusual road (FU) specification would be suitable for sports car application. In summary, the City expressway/Altered road design (CA) specification defines the lower limit for use in general mass market road service while the Highway/Altered road design (HA) specification defines the lower limit for use in specialty market road service applications.

These minimum requirements, which any battery will have to meet in order to be used in a respective type of road service, are rounded off to the nearest whole number and summarized below.

| NET MASS MARKET SPECIFICATIONS | | | | |
|---|---|---|---|---|
| Specification | Watts Per Pound | Watt Hours Per Pound | Percent Battery Weight | 200 Mile Cruising Speed (mph) |
| General Road Market: | | | | |
| FN | 40 | 106 | 25% | 75+ |
| FA | 28 | 76 | 35% | 75+ |
| EN | 28 | 87 | 25% | 65–75 |
| EA | 20 | 62 | 35% | 65–75 |
| CN | 19 | 70 | 25% | 55–65 |
| CA | 14 | 50 | 35% | 55–65 |
| Specialty Road Market: | | | | |
| HN | 13 | 57 | 25% | 45–55 |
| HA | 9 | 40 | 35% | 45–55 |

Referring now to the various power sources which must meet these minimum requirements, the most common commercial rechargeable battery types are listed below along with their typical performance characteristics.

| Battery Type | Watts Per Pound | Watthours Per Pound |
|---|---|---|
| Lead Acid | 10 | 12–15 |
| Nickel-Cadmium | 20 | 15–25 |
| Nickel-Iron | 20 | 12–15 |
| Silver-Zinc | 20 | 30–60 |

Of these batteries, only silver-zinc batteries have the necessary performance characteristics to enter the general road market though its cost is prohibitive due to its high content of silver. While the other types are relatively safe to use and have sufficient specific power, their specific energy is too low. Although the other batteries can be redesigned to have greater performance in both energy and power, the lead acid battery from a theoretical standpoint can not be redesigned to have an energy density much greater than 25 watthours per pound, a value which is hopelessly too low for use in any general road market. Moreover the nickel cadmium and nickel iron batteries become very expensive when they are redesigned to have higher energy densities than those listed.

Therefore, the most common rechargeable battery designs currently in use today either cost too much or lack sufficient performance to be used to power a road vehicle except in extremely small niche markets.

Some uncommon types of rechargeable batteries which have been developed for moving vehicle use are listed below along with their typical performance characteristics:

| Battery Type | Watts Per Pound | Watthours Per Pound |
|---|---|---|
| Sodium sulfur | 60 | 36 |
| Zinc bromide | 18 | 40 |
| Nickel metal hydride | 80 | 20 |

In regard to sodium sulfur batteries, they contain sodium metal and must operate at very high temperatures, generally around 500 degrees Fahrenheit. Consequently, they present serious manufacturing problems and safety hazards. Since they lose heat energy while not in use, an external source of power is also required to reheat the battery if it is idle too long, making sodium suffer batteries even less desirable.

Zinc bromide batteries uses highly toxic bromine gas, which even in small quantities, can kill a large number of people should the bromine tank or piping develop a leak during a wreck or even in a simple malfunction. Thus, it would be impossible to use this design in hundreds of thousands of vehicles which will operate in and near major population centers.

Nickel metal hydride batteries have the disadvantages of nickel-cadmium batteries in that they have low energy density unless specifically designed for high energy content at which time they become overly expensive.

In addition to the above rechargeable batteries, a large number of designs have been tried without success primarily because they usually have one or more disadvantages of the above designs but to an even greater degree. They tend to have less specific energy or power and at higher cost. The best of these designs are listed below along with their typical performance characteristics.

| Battery Type | Watts Per Pound | Watthours Per Pound |
|---|---|---|
| Lithium | 1 | 60 |
| Zinc air | 2 | 150 |

| Battery Type | Watts Per Pound | Watthours Per Pound |
| --- | --- | --- |
| Aluminum air | 4 | 250 |
| Iron air | 2 | 80 |

In regard to lithium batteries, they use highly reactive lithium metal and can explode if an internal fault in the battery allows lithium metal to come into contact with the cathode material in a high power design. Because of this, it is difficult to find materials for a lithium battery which will yield high power and high energy in a safe manner and at a reasonable cost.

The remaining battery types are all metal-air cells which operate by using oxygen in the earth's atmosphere to burn or oxide a metal in order to produce electricity. Metal-air cells are safe to operate and typically have high specific energy. Unfortunately, they have traditionally had very low specific power and high costs. Because of their traditionally low specific power, metal-air batteries lack the power to provide adequate cruising speed necessary for commercial success. The primary reason for this is the conventional design of gas diffusion cathodes used in these batteries. In order to obtain high specific power for the battery, the cathode must produce a large current per unit weight. In doing so, the specific energy is drastically limited, i.e., the battery is not capable of producing the requisite current over a long period of time.

Previous cathode designs relied heavily on expensive catalyst in combination with costly metal grids. The metal grids, typically woven wire or perforated or expanded metal foil, are used both as current collectors and as structural members in the cathode. Because the metal used in the grids is dense, a very large amount of chemical reactivity is used to raise the specific power of the cathode to a level high enough for use in automobile operation. This is typically done by operating the batteries at high temperatures and using expensive catalysts, thus placing the cost of such batteries beyond practical commercial operation.

Of the metal-air designs, the most promising are the zinc and aluminum. However, both the zinc and aluminum metal-air batteries present difficult recharging problems in addition to the high costs of an acceptable active cathode. Consequently, they tend to have adequate specific energy but inadequate specific power and high costs. Examples of such batteries are disclosed in U.S. Pat. Nos. 4,957,826 and 5,318,861.

Whatever battery design used, to be a viable power source in moving vehicles, the battery must be rechargeable. The three methods commonly used to recharge batteries are electrical recharging, mechanical recharging, and chemical recharging. Chemical recharging is actually a type of mechanical recharging whereby only the active chemicals which produce the electricity are removed and replaced, usually via a medium referred to as a slurry. In chemical recharging, the battery is not physically disassembled as with traditional mechanical recharging in which the entire anode structure is usually replaced. Please refer to U.S. Pat. No. 4,950,501 for an example of such a mechanically rechargeable metal-air battery.

However, in chemical recharging, the active anode material is not in hard contact with the anode bus system which prevents the anode from producing as much power as mechanically recharged anodes. In order to overcome this disadvantage, some metal-air battery designs, such as that shown in U.S. Pat. No. 5,006,424, have attempted to use metal particles coated with active material. The particles are pumped into an anode current collector which has holes at the bottom small enough to permit an uncoated particle to pass but a coated particle will be trapped so that a series of coated particles will be collected in the anode structure. Once the active material around a metal particle dissolves, the metal particle is small enough to pass through the holes. The particles collected in the anode structure are compact together and pressed against the anode current collector, thus forming an electrical connection. An apparent disadvantage of this design is that the metal particles add an additional weight to design and reduce both specific energy and specific power.

In an alternative design, shown in S.A.E. transaction 710237, a chemically recharged metal battery is disclosed which uses metal coated plastic fibers as a current collector. The active particles are trapped in these fibers where they react and dissolve in the electrolyte slurry. This design requires the use of an excessive amount of electrolyte so as to ensure the reaction product is completely dissolved. Otherwise, if the electrolyte were to become saturated with reaction product, the active particles would become coated with reaction product, insulating the active particle and ceasing the reaction. Consequently, though the excessive electrolyte keeps the acting particles in good electrical contact with the current collector and tends to avoid passivation, the excessive weight of the electrolyte decreases the specific energy and specific power.

Another design of a chemically recharged metal-air battery is disclosed in U.S. Pat. No. 4,491,624, wherein a system is disclosed in which the cells of the battery are rotated in a complicated assembly in order to force the metal particles suspended in an excess electrolyte slurry into the anode current collector under centrifugical forces. This complicated system would appear to be expensive to construct and occupies a large volume of space. Accordingly, such a design would not appear to be capable of producing the specific energy and specific power necessary for use in motor vehicles.

Thus, it can be appreciated by one skilled in the art that it would be desirable to have a rechargeable battery capable of producing the minimum performance requirements of specific power and specific energy while also meeting the commercial requirements of specific cost and safety.

SUMMARY OF THE INVENTION

Briefly described, the present invention is a rechargeable metal-air battery system which is inexpensive to manufacture, light weight, and adaptable to virtually any electric powered automobile, including cars, trucks, vans, and buses as well as various other battery requiring arrangements. The present invention incorporates an improved cathode design which offers greater specific power at a lower cost than presently available in conventional cathode designs by combining a simple high strength frame with an inexpensive and lightweight metal current collector. In addition, the present invention incorporates a chemical recharging process which incorporates a circulating electrolyte and active material solution which periodically introduces a slurry of electrolyte including regenerated active material and new active material into the anode current collector. The spent active material removed from the anode current collector is regenerated for recirculation back into the anode current collector while the battery is in operation.

A battery system in accordance with the present invention comprises a metal-air battery cell having a plurality of light weight plate groups, a fluid electrolyte, a divester, and a conduit for transferring fluid electrolyte from the battery cell to the divester and back to the battery cell. In operation, particulate active material suspended in the electrolyte reacts with the anode current collector of each plate group within the battery cell producing metal oxide which dissolves in the electrolyte until the reaction stops or the electrolyte becomes saturated with metal oxide. If the electrolyte becomes saturated, passivation occurs and an insulating layer of oxide forms around the active material. Thus, the electrolyte removed from the cell typically comprises particulate active material at least partially covered in a layer of oxide which must be removed in order for the active material to further react with the anode current collectors when recirculated. Thus, a divester is provided to divest the active material removed from the anode of the layers of oxide formed thereon. The divester accomplishes this by bringing the particles of active material into frictional contact with one another, thereby removing the oxide layer and exposing new active material. The regenerated active material is then pumped from the divester back into the battery cell for further reaction with the anode current collectors within the battery cell, maintaining the battery cell's operation.

An advantage of the present invention is that it provides a rechargeable metal-air battery system capable of operating with a minimal amount of fluid electrolyte because the battery system's operation is not inhibited by the occurrence of passivation which results once the electrolyte becomes saturated with metal oxide.

Another advantage of the present invention is that it provides a rechargeable metal-air battery system for powering automobiles which comprises essentially no precious metal components, and thereby substantially reducing the cost of the battery system.

Another advantage of the present invention is that it provides a rechargeable metal-air battery system which includes a battery cell comprising plate groups having their structural rigidity provided by a frame structure and not the current collectors, and therefore, dramatically reduces the weight of battery cells.

Other features, and advantages of the present invention will become apparent from the following description when considered in conjunction with the accompanying drawings.

BRIEF DESCRIPTION OF THE DRAWINGS

FIG. 7 is an exploded perspective view of one plate group of the battery cell in FIG. 4A, including a portion of the battery cell's frame structure shown in FIG. 5; and FIG. 8 is a block diagram illustrating an alternative embodiment of a metal-air battery system embodying the principles of the present invention.

DETAILED DESCRIPTION OF THE PREFERRED EMBODIMENT

Figure 1:
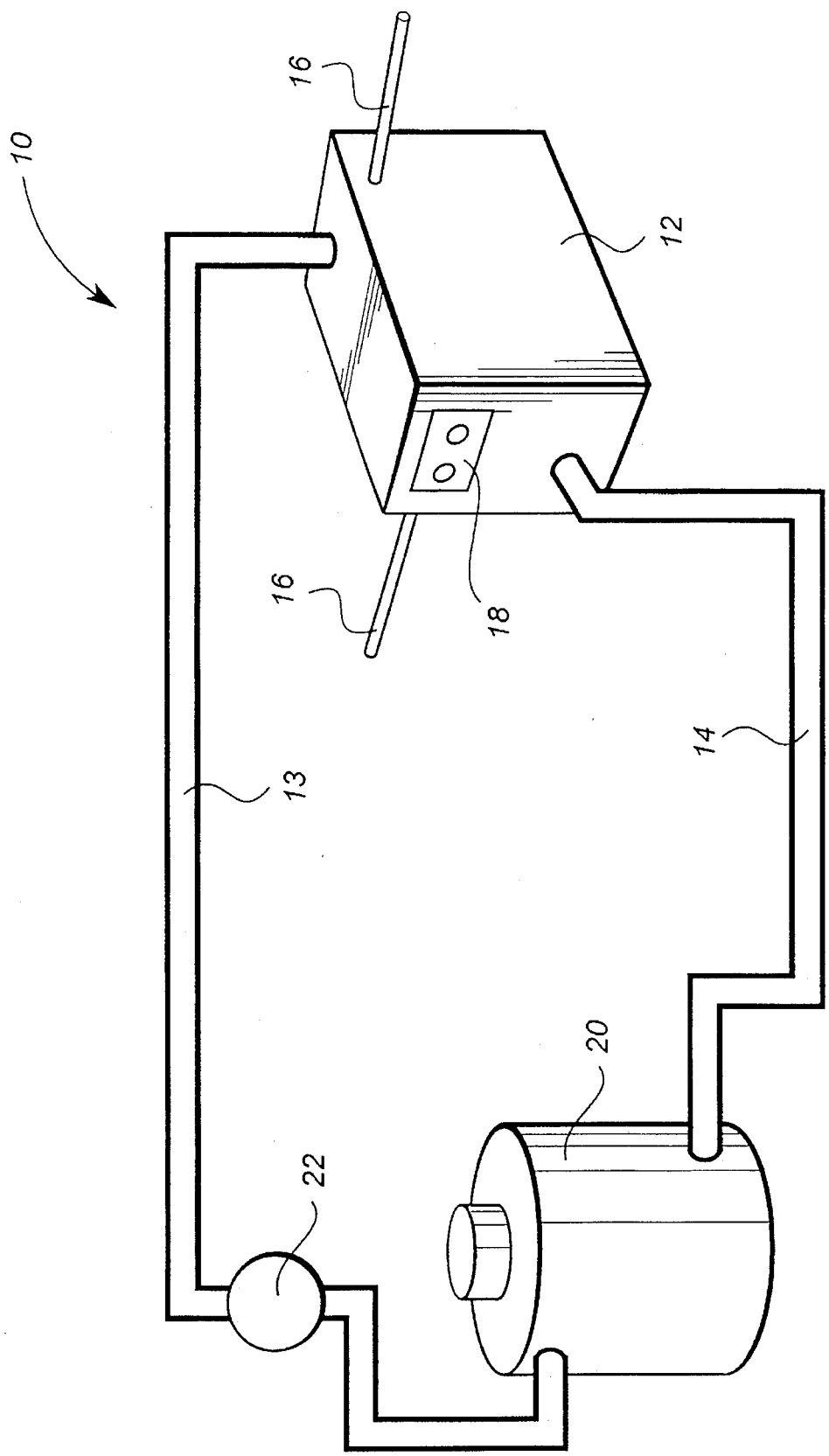
FIG. 1 is a front perspective view of a rechargeable metal-air battery system embodying the principles of the present invention.

For purposes of illustrating the present invention, the following description describes a preferred embodiment in the context of a metal-air battery. However, it will be appreciated by those skilled in the art that a rechargeable battery system and method in accordance with the present invention can take many forms and still be with the spirit and scope of the present invention. With reference to the drawings wherein like reference numerals represent corresponding parts throughout the several views, FIG. 1 is a perspective view of a chemically rechargeable metal-air battery system 10 in accordance with the present invention. The chemically rechargeable metal-air battery system 10 is configured to provide at least the minimum power output required for safely powering electric automobiles without the excessive cost of most conventional battery systems. The overall weight of battery system 10 is markedly less than that of conventional batteries partly because the battery system 10 utilizes novel current collectors configured to be exceptionally light in comparison to conventional current collectors because the elements comprising the current collectors are not required to provide structural rigidity. Further, the operation of battery system 10 is sustained during operation by the recirculation of regenerated active material suspended in a fluid electrolyte. The battery system 10 is configured so that the electrolyte and active metal can be periodically replaced. The cost of a battery cell 12 for battery system 10 is less than that of conventional electric automobile metal-air battery cells because of the novel structure and absence of precious metals.

As illustrated in FIG. 1, battery system 10 comprises at least one battery cell 12 having input conduit 13 and output conduit 14. Conduits 13, 14 allow for the passage of fluid electrolyte and active material through cell 12, thereby sustaining its operation. The fluid electrolyte utilized for the preferred embodiment of the present invention is fluid potassium hydroxide, though it is well known in the art that there are numerous other solutions which can be used such as other metal hydroxides and metal salt solutions. Suspended in the electrolyte solution are particles of active material which react with the anode current collectors of battery cell 12 so as to produce current flow. Typically the active material is a particulate metal which is non-reactive in air or water, for example, but not limited to, aluminum (Al), zinc (Zn), or magnesium (Mg.).

The air necessary for the operation of the metal-air battery cell 12 is provided by ports 16 in cell 12. An air scrubber, not shown, may be attached to an input port 16 to remove carbon dioxide from the air and to add in moisture which will extend the life of the cathode of battery cell 12. If an air scrubber is not utilized, it is preferable to at least have a dry filter to cleanse the air entering cell 12 of debris and bugs. A pair of terminals 18 are disposed on the exterior of cell 12 for transferring power generated therein. Connected to cell 12 via conduits 13, 14 is divester 20. A main pump 22 is provided to facilitate the flow of electrolyte from divester 20 to cell 12 and back to divester 20 via conduits 13, 14.

Divester 20 is a device for removing the oxide layer formed on the particles of active material suspended within the electrolyte solution. To better understand this concept, the following is a brief description of what chemical reactions take place at the anode and cathode of a metal-air battery. In essence, as the particles of active material suspended in the electrolyte come into contact with an anode current collector of a metal-air battery, the particles oxidize producing an oxide. The net reaction at the anode can be represented as $2Zn+4OH^- \rightarrow 2Zn(OH)_2$.

The Zinc hydroxide ($Zn(OH)_2$) produced at the anode may either dissolve in the electrolyte if the electrolyte is unsaturated or it may form as a coating on the surface of the particles of active material, as will be discussed in greater detail below. Assuming the $Zn(OH)_2$ dissolves, it precipitates from the electrolyte as zinc oxide or zinc hydroxide.

At the cathode, the following net reaction takes places as the electrolyte is exposed to oxygen: $O_2+H_2O \rightarrow 4OH^-$. The hydroxide ions within the electrolyte pass from the cathode to the anode where they react with the zinc to form zinc hydroxide, thereby creating current flow between the anode and cathode.

At some point the electrolyte will become saturated with dissolved oxide and the oxide will no longer dissolve in the electrolyte but remain on the particles of active material creating a layer of oxide. If not addressed, the oxide layer will begin to act as an insulator to the particles and essentially inhibit their ability to react with the anode current collector, reducing the voltage and current flow, and ultimately ceasing the operation of the metal-air battery. This is commonly referred to as passivation. To combat passivation, previous battery designs have utilized large volumes of electrolyte so as to increase the amount of oxide which must dissolve in the electrolyte before the electrolyte becomes saturated.

In accordance with the present invention, divester 20 brings the particles of active material into frictional contact with one another, thereby removing the oxide layer on the particles. As a result, the regenerated particles of active material can be recirculated back into cell 12 for further reaction with the anode current collector. Because passivation is controlled, battery system 10 does not necessitate a high volume of electrolyte which would dramatically increase the weight of battery system 10. Furthermore, the operation of divester 20 acts to stir or suspend the regenerated active particles within the electrolyte for facilitating their recirculation back into battery cell 12. As may be appreciated by one of skill in the art, such a device as divester 20 can take numerous forms such as those shown in FIGS. 2A, 2B and 3. In addition, it is with the scope of the present invention to have a divester which utilizes ultrasonic agitation or hydraulic jet agitation to divest the particles of active material of oxide.

Figure 2A:
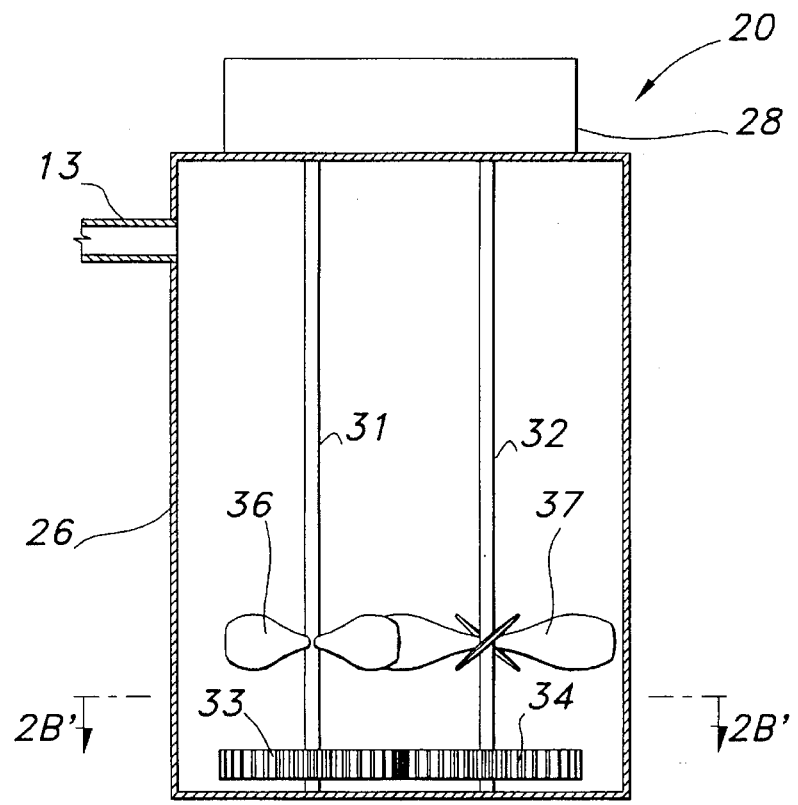
FIG. 2A is a cross-sectional elevation view of a first embodiment of the divester in the battery system of FIG. 1.
Figure 2B:
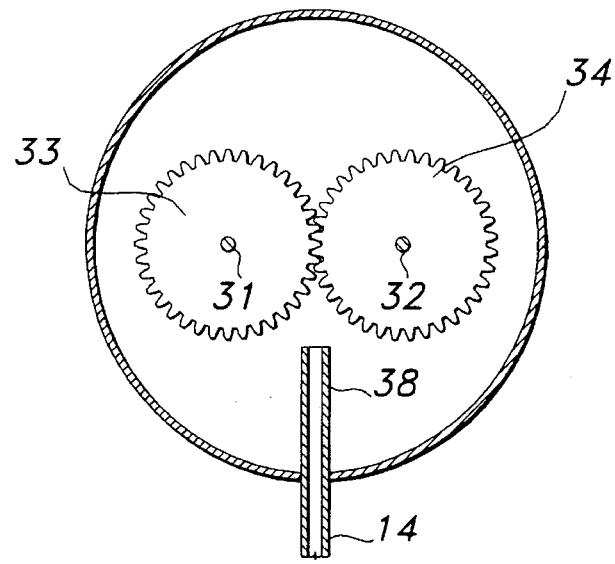
FIG. 2B is a cross-sectional plan view of the divester illustrated in FIG. 2A taken substantially along line 2B'—2B' in FIG. 2A.

As shown in FIGS. 2A and 2B, a first embodiment of divester 20 includes a container 26 having input conduit 13 and output conduit 14 attached thereto. Accordingly, electrolyte leaving cell 12 will enter divester 20 through conduit 14 and pipe 38, shown in FIG. 2B, and will exit divester 20 through conduit 13, shown in FIG. 2A. Mounted to the top of container 26 is an actuator 28, such as an electrical motor, for rotating shafts 31, 32 which extend downwardly to the bottom of container 26. Mounted to shafts 31, 32 are meshing gears 33, 34 and impellers 36, 37 respectively. The flow of electrolyte into container 26 is directed by pipe 38 which is in communication with conduit 14, as shown in FIG. 2B. Upon the actuation of shafts 31, 32, meshed gears 33, 34 rotate and grind or scrub the partially spent particles of active material introduced into container 26 via pipe 38, thereby removing the oxide therefrom. Additionally, impellers 36, 37 create a suspension of the regenerated particles in the electrolyte contained within container 26, thereby enabling the regenerated active particles to be removed via conduit 13. The regenerated electrolyte can be removed either continuously or periodically from divester 20 through conduit 13 and transferred to cell 12 for introduction in battery cell 12.

Figure 3:
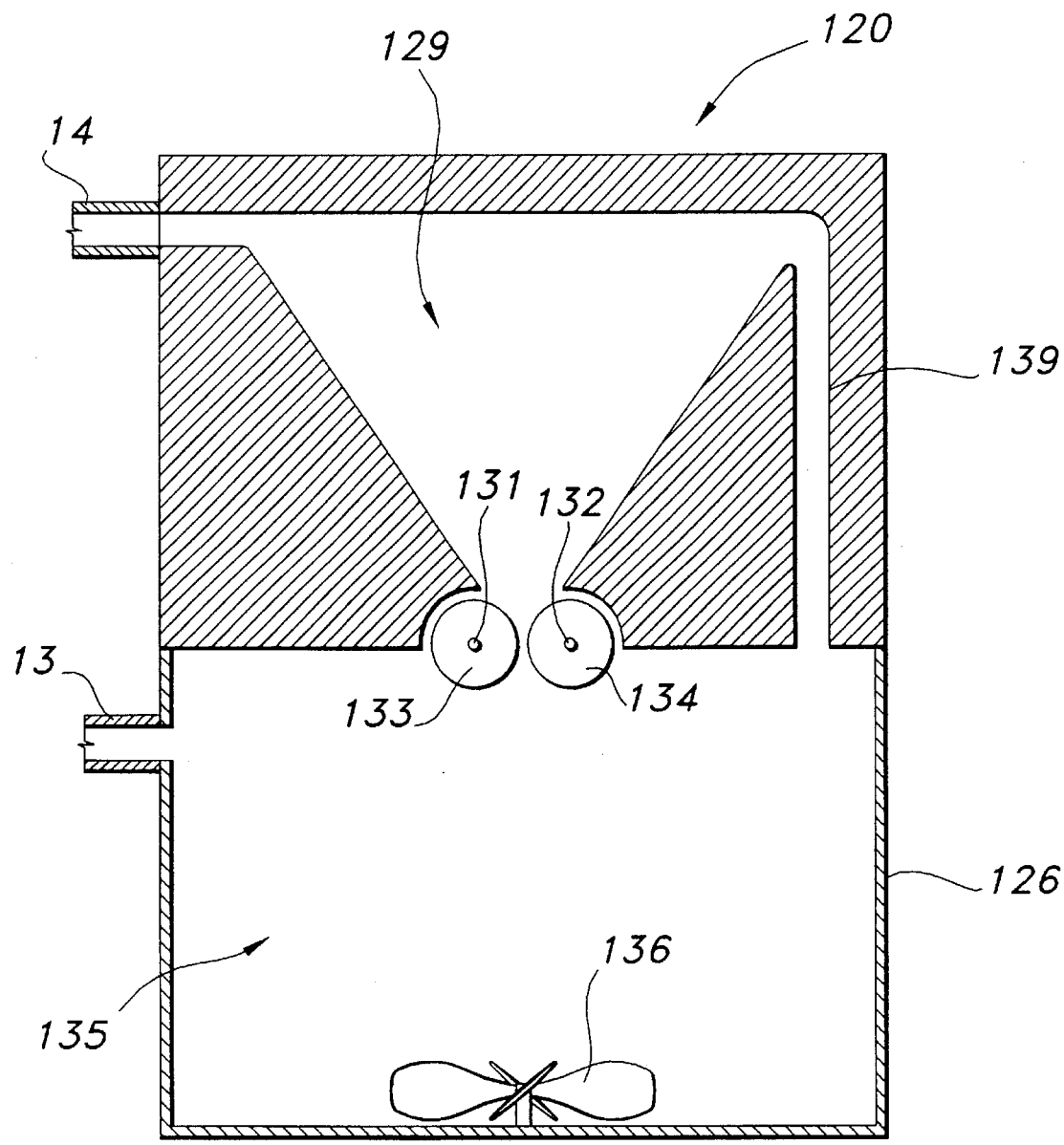
FIG. 3 is a cross-sectional elevation view of a second embodiment of the divester in the battery system in FIG. 1.

A second embodiment of divester 20 is shown in FIG. 3 and denoted by numeral 120. Divester 120 comprises a container 126 having conduits 13, 14 for the introduction and removal of electrolyte, and having a tapered receptacle 129. Electrolyte exiting from cell 12 enters divester 120 through conduit 14 where the partially spent particles of active material tend to settle towards the bottom of receptacle 129. Any excess electrolyte passes through conduit 139 and flows into lower portion 135 of container 126. The particles settling to the bottom of receptacle 129 are grounded together by rollers 133, 134 rotating about axes 131,132, respectively. Rollers 133, 134 are actuated by any suitable device such as electric motor, not shown, which is attached to the exterior of divester 120. Disposed at the bottom of container 126 within lower portion 135 is an impeller 136 for suspending the regenerated particles in the electrolyte. As with divester 20, the regenerated electrolyte is removed either continuously or periodically from divester 120 through conduit 13.

Figure 4A:
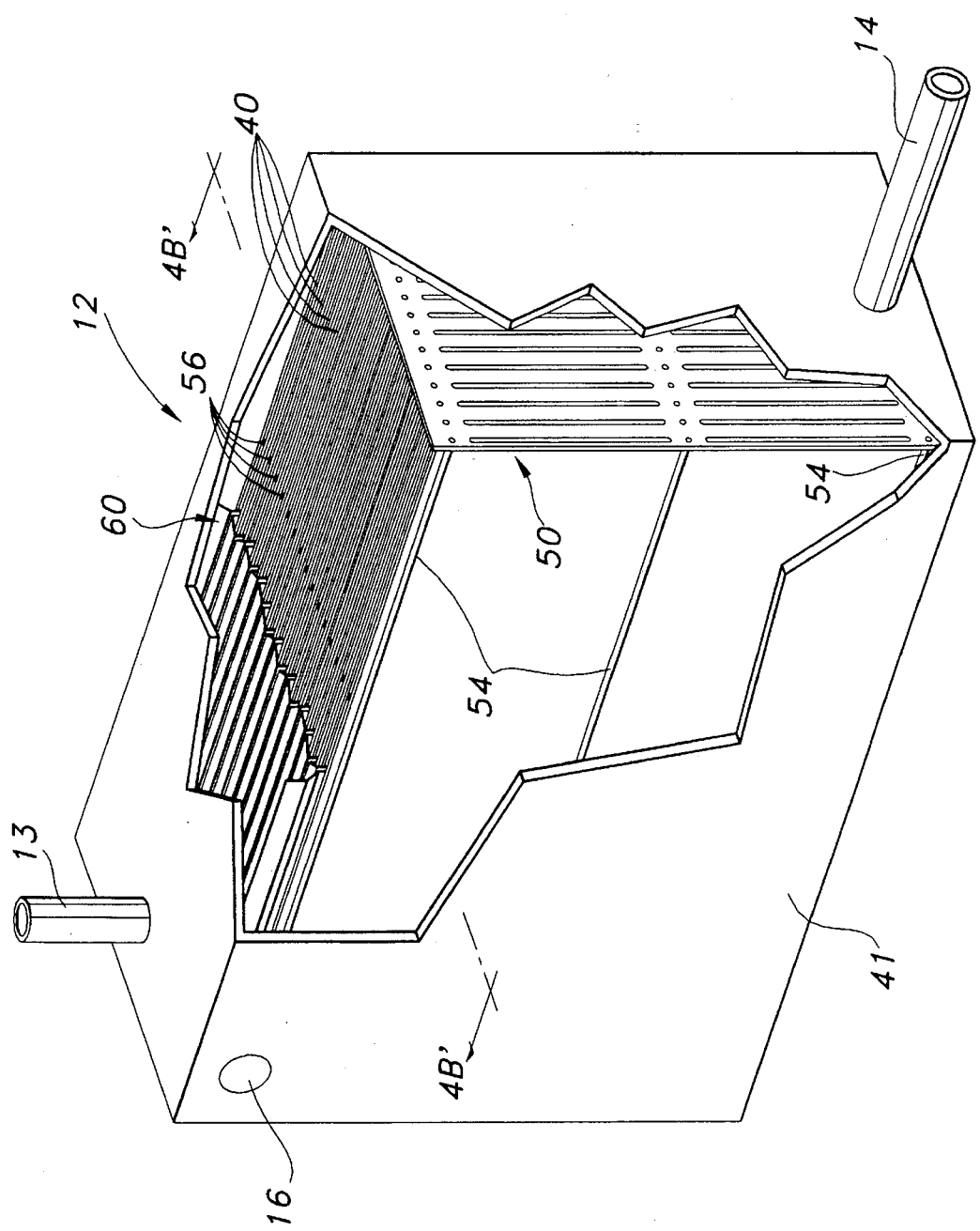
FIG. 4A is a partially cut-away perspective view of the battery cell of the battery system in FIG. 1.
Figure 4B:
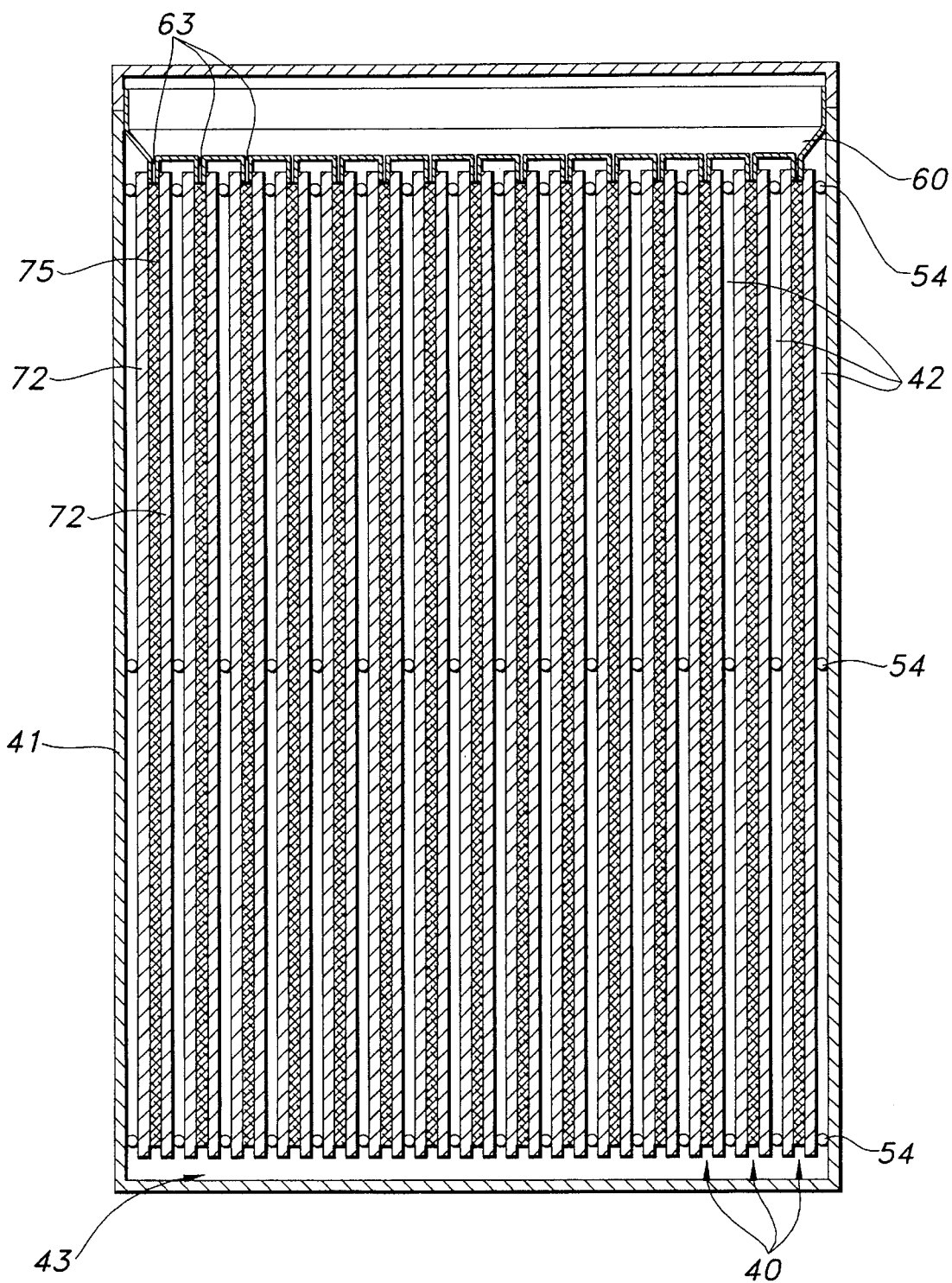
FIG. 4B is a cross-sectional front elevation view of the battery cell in FIG. 4A taken substantially along line 4B'–4B' in FIG. 4A.
Figure 5:
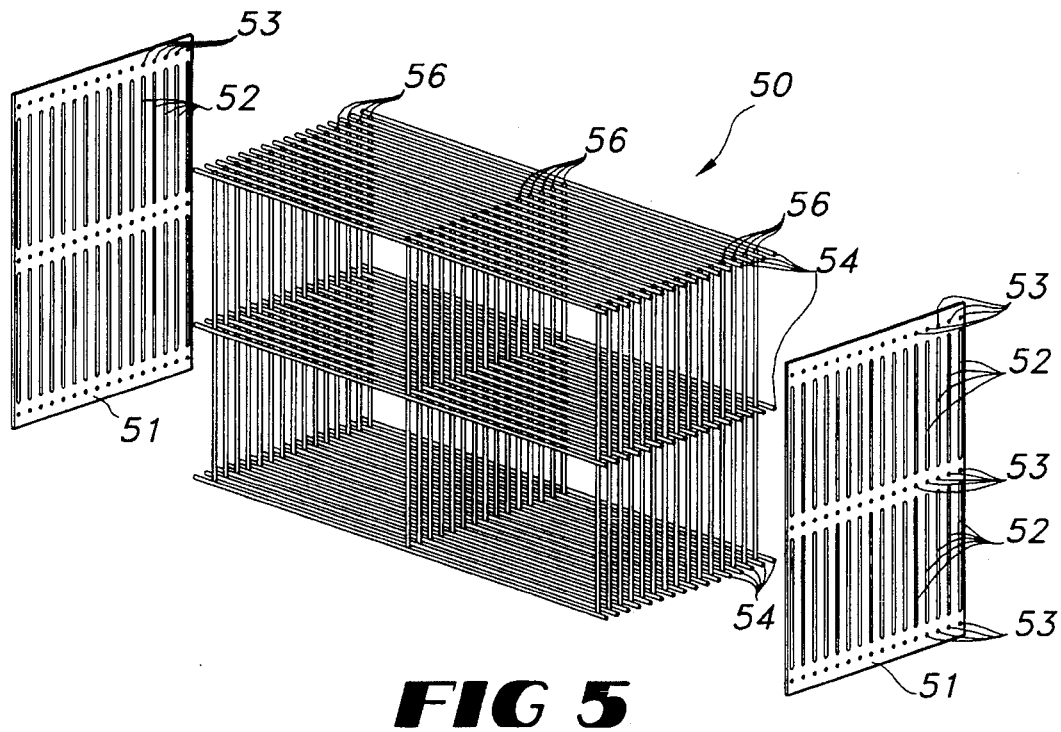
FIG. 5 is an exploded perspective view of the frame structure of the battery cell in FIG. 4A.

Referring to FIGS. 4A and 4B, battery cell 12 comprises a plurality of plate groups 40 in a parallel configuration, longitudinally aligned within a cell case 41 and forming a stack. A plate group 40 constructed in accordance with the present invention possesses little structural rigidity, as will be discussed in greater detail hereinafter, and therefore must receive structural rigidity from frame structure 50, as best seen in FIG. 5. In reference to FIG. 5, frame structure 50 comprises end plates 51, each end plate 51 having a plurality of vertical slots 52 for allowing the passage of air between plate groups 40. Furthermore, each end plate 51 comprises a plurality of holes 53 configured for receiving the end portions of horizontally extending rods 54 which connect the respective end plates 51. Vertically extending rods 56 are disposed and pinched between adjacent pairs of horizontal rods 54. The rods 56 are actually integrated into anode current collectors 75 of each plate group 40, as discussed in more detail below in the text discussing FIG. 7. Thus, plate groups 40 are held securely in place by horizontal rods 54 and vertical rods 56. Both the end plates 51 and rods 54, 56 are preferably constructed out of a strong light weight material such as fiberglass or carbon composite.

Figure 6A:
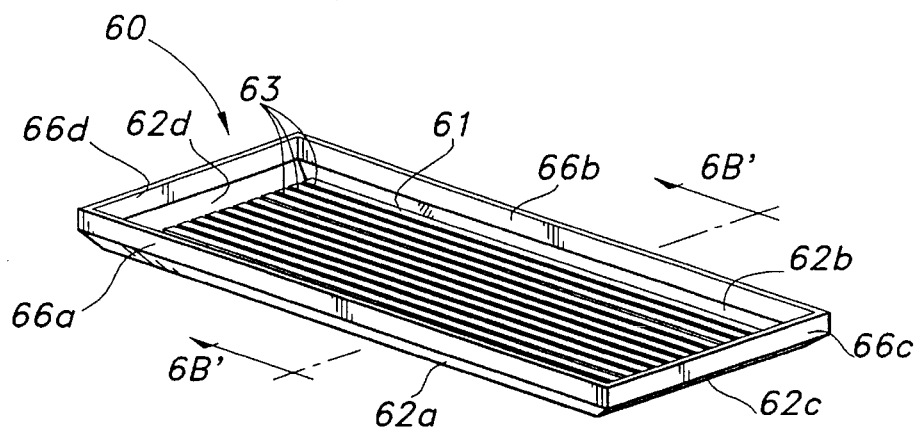
FIG. 6A is a front perspective view of the electrolyte dispersement tray of the battery cell in FIG. 4A.
Figure 6B:
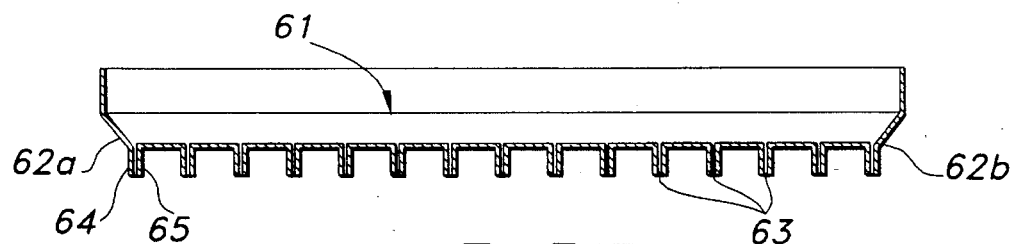
FIG. 6B is a cross-sectional view of the electrolyte dispersement tray of FIG. 6A taken along line 6B'–6B' in FIG. 6A.

Disposed on top of frame structure 50 is a dispersement tray 60, shown in FIGS. 6A and 6B, for evenly distributing the fluid electrolyte to the individual plate groups 40. As illustrated in FIGS. 6A and 6B, tray 60 includes four vertical wall portions 66a, 66b, 66c and 66d in a rectangular configuration so as to fit securely against and flush with the interior walls of cell case 41. Below wall portions 66a–66d are disposed angled wall portions 62a, 62b, 62c, and 62d which direct the flow of electrolyte to prevent the active particles from settling in the corners of tray 60. Disposed along the bottom surface 61 of tray 60 are a plurality of parallel slots 63. Extending downwardly from either side of each slot 63 and defining the flow path of the electrolyte are sidewalls 64, 65, as shown in FIG. 6B.

Referring back to FIG. 4B, each plate group 40 is separated from an adjacent pair of plates 40 by three vertically spaced horizontal rods 54 so that air may pass through the gaps 42 between pair plates 40. The electrolyte entering cell 12 is distributed to the respective plate groups 40 by tray 60 through slots 63. Spent electrolyte is collected in the lower portion 43 of cell case 41 and removed through output conduit 14.

FIG. 7 is a exploded view of a plate group 40 configured in accordance with the present invention. Each plate group 40 comprises an anode 71 and two air-cathodes 72. Included in FIG. 7 is a portion of frame structure 50, specifically rods 54, 56, which provide structural rigidity to plate groups 40. Anode plate 71 comprises an anode current collector 75 having an electrical lead 76 attached thereto. Anode current collector 75 comprises any light weight conductive mesh structure capable of retaining fluid electrolyte such a porous mass of threadlike metal fibers. In such a configuration, the electrolyte is retained within the fibrous current collector by the surface tension of the electrolyte. Further, electrical lead 76 is spot welded or soldered to the upper portion of the fibrous anode current collector 75 so as to maintain electrical contact. In the preferred embodiment, the anode current collector 75 is made of stainless steel although it is well known in the art that other non-precious metals such as a corrosive resistant alloy or a metal plated with a corrosive resistive alloy can be utilized. Because of the novel configuration of anode current collector 75, its weight is approximately 0.03 to 0.06 lb/sq. ft. using stainless steel, which is substantially less than that of conventional anode current collectors. Though not shown, it is also within the scope of the present invention to incorporate one or more vertical slots in anode current collector 75 to facilitate the flow of electrolyte introduced therein.

As illustrated in FIG. 7, anode current collector 75 is sandwiched between two separator members 77 constructed of a light fibrous material which is impervious to the particles of active material suspended in the electrolyte but which readily allows the hydrogen ions to pass through to the air-cathodes 72. In the preferred embodiment, separator members 77 are made of a woven cloth which provides tensional strength to anode current collector 75.

Disposed on either side of and in contact with the anode 71 are air-cathodes 72. Each air-cathode 72 comprises a cathode current collector 80 which consist of an electric lead 81 electrically connected to a plurality of parallel conductors 82 by a bus member 84. Though bus member 84 is shown connected to the top portions of parallel conductors 82, bus member 84 may be connected at any point along the length of conductors 82. In addition, a plurality of bus members 84 may be utilized in a parallel configuration in which bus members 84 are in contact and positioned transverse to the parallel conductors 82. Current collector 80 is preferably constructed of a non-precious metal such as, but not limited to, stainless steel. Because of the novel configuration of cathode current collector 80, its weight is approximately 0.02 to 0.06 lb/sq. ft. using stainless steel, which is substantially less than that of conventional cathode current collectors which are designed to provide the structural rigidity to the plate groups.

Disposed on either side and in contact with cathode current collectors 80 are cathode catalyst layers 83. Cathode catalyst layers 83 comprise a porous mixture of carbon black or carbon black supported oxygen reduction catalyst, typically bonded with polyetrafleroethylene (PTFE).

A complete plate group 40 is approximately 0.1 inches thick. Each cell 12 preferable comprises a stack of twelve plate groups 40 electrically connected in either a series or parallel configuration. The battery system 10 can also be operated with more than one cell, in which case the cells can be connected in either series or parallel. For operation in an electric automobile, it has been determined that a series connection of both the plate groups 40 and cells 12 is preferable so that the requisite voltage can be achieved.

OPERATION

In operation, a battery system 10, configured in accordance with the present invention, is capable of sustained operation over extended periods of time through the circulation of regenerated electrolyte having particles of active material suspended therein. Initially, electrolyte is pumped from divester 20 via the main pump 22 through input conduit 13 and into battery cell 12. In cell 12, the electrolyte is distributed to the anode current collectors 75 of each respective plate group 40 within cell 12. The electrolyte is channeled into each anode current collector 75 by slots 63 in the bottom of tray 60, as shown in FIG. 4A. The active material within the electrolyte reacts with the anode current collector 75 causing current to pass between anode current collector 75 and cathode current collector 80. The reaction between the active material and current collector 82 produces oxide as the active material burns. The oxide dissolves in the electrolyte until the electrolyte becomes saturated, at which point, the oxide remains on the active material forming an insulating layer about the particles of active material. Over time, this process, known as passivation, can dramatically reduce the power output of battery system 10.

Once saturated, the electrolyte substantially comprises oxide, partially spent metal particles in an intermediate state between metal and oxide, and metal particles substantially covered by a layer of oxide. Electrolyte in this state is referred to as spent electrolyte though a portion of the active particles in the electrolyte may still be capable of reacting with the anode current collector 75. When the power output of battery system 10 drops below a predetermined level set according to the battery system's 10 application, the spent electrolyte in cell 12 is flushed out with regenerated electrolyte from divester 20. Alternatively, a constant flow of regenerated electrolyte may be introduced into cell 12, constantly flushing the spent electrolyte. The spent electrolyte is collected in the lower portion 43 of cell case 41 and removed from cell 12 through output conduit 14 and returned to divester 20.

In divester 20 the partially spent and spent metal particles having an oxide layer are divested of their oxide layer by the grinding action of gears 33, 34. In addition to removing the oxide layer from the active metal, impellers 36, 37 in divester 20 create a suspension of the regenerated active particles which is subsequently removed from divester 20 through conduit 13 and reintroduced into cell 12 for further reaction with the anode current collector 75.

A battery configured in accordance with the preferred embodiment of the present invention may be chemically recharged by removing the oxide in the electrolyte and adding new particles of active material. This is preferably done at divester 20. Additionally, the battery system 10 may need to be periodically flushed to remove any particles that may have settled in cell 12 or divester 20. This may be accomplished with a fresh electrolyte solution or a mild acidic solution.

ALTERNATIVE EMBODIMENT

As shown in FIG. 8, an alternative embodiment of the battery system, denoted by numeral 110, configured in accordance with the present invention adds several components to battery system 10 which provide enhanced performance and efficiency.

Specifically, oxide separator tank 112 is added so that particular active material constituents of the electrolyte removed from battery cell 12 can be separated from the oxide and selectively transferred to divester 20 for regeneration, as denoted by reference numeral 114. The oxide left in oxide separator tank 112 is then transferred to an oxide holding tank 122, as denoted by reference numeral 115. A clearing pump 116 is added to flush out particles which have settled at the bottom of cell 12. Lastly, a storage tank 118 has been added to hold new active material which is periodically introduced into battery system 110, as denoted by reference numeral 124.

In operation, electrolyte leaving cell 12 enters oxide separator tank 112 where the heavier constituents in the electrolyte settle out, typically the partially spent particles. These particles are removed from separator tank 112 and transferred to divester 20 for regeneration. The lighter constituents of the electrolyte in separator tank 112, typically oxide, are removed to oxide holding tank 112. Periodically, electrolyte is taken from separator tank 112 and pumped through cell 12 via pump 22. Lastly, clearing pump 116 removes settled particles residing in cell 12 so as to maintain the efficiency of battery system 110.

In a recharging cycle, the oxide and electrolyte in oxide holding tank 112 are substantially emptied into a refueling station 126 as indication with phantom line 128. At the same time the oxide holding tank 122 is emptied, storage tank 118 is filled with new active material suspended in an electrolyte slurry, as indicated with phantom line 130. Preferably, refueling station 122 will be a commercially driven operation substantially similar to the modem gas station. The appropriate time for a recharging cycle may be provided by various means as will be apparent to one skilled in the art such as a power output sensor, or active material level sensor. During the time between recharging cycles, electrolyte may periodically be removed from oxide holding tank 122 and transferred to divester 20 to replace electrolyte which may have evaporated while circulating through battery system 110, as indicated by reference numeral 132. The appropriate timing for transferring new active material from storage tank 118 to divester 20 may be provided by various means as will be apparent to one skilled in the art, such as a timer device, a level sensor, or a power output sensor.

It will be obvious to one of ordinary skill in the art that many modifications and variations can be made to the preferred embodiment described above without departing from the novel teachings of the present invention. All such modifications and variations are intended to be incorporated herein and within the scope of the following claims.

Wherefore, the following is claimed by the inventor:

1. A rechargeable battery system having an electrolyte slurry containing active metal particles, a portion of the active metal particles having an outer layer of reacted metal oxide, comprising:

a plurality of plates forming an anode and a cathode;

a cell case housing said plates and having an output and an input conduit;

divester means in communication with said cell case for at least partially divesting the outer layer of reacted metal oxide from the active metal particles in the electrolyte slurry;

and pump means for recirculating the electrolyte slurry from the output conduit to the input conduit through said divester means.

2. The system of claim 1, wherein said divester means removes said oxide from said metal particles and re-suspends said metal particles in the electrolyte slurry.

3. The system of claim 1, wherein said divester means comprises:

a container having at least one conduit port for introducing said electrolyte slurry into said container; and grinding means disposed in said container for grinding said metal particles.

4. The system of claim 1, further comprising an oxide separator tank connected to said output conduit of said cell case for separating oxide and active metal particles.

5. The system of claim 1, further comprising an active metal storage tank connected to said port of said divester means for holding new active metal particles for introduction into said divester means.

6. The system of claim 1, further comprising an oxide storage tank connected to said port of said divester means for providing storage means for spent metal oxide or hydroxide particles.

7. The system of claim 1, further comprising means for chemically recharging said battery system by removing said oxide and said electrolyte slurry and introducing new active metal particles and electrolyte in said battery system.

8. The system of claim 1, further comprising means for removing a portion of said electrolyte containing oxide.

9. The system of claim 1, further including a frame structure in said cell case for providing structural rigidity to said plates.

10. A method for sustaining operation of a metal-air battery having a battery case, comprising the steps of:

retrieving from said battery case electrolyte substantially saturated with reactant metal particles and oxide;

divesting the reactant metal particles in the saturated electrolyte of an oxide layer so as to expose a portion of an active metal of said metal particles;

suspending said divested metal particles and oxide particles in the electrolyte;

recirculating said suspended metal particles in the electrolyte into said battery case.

11. The method of claim 10, wherein the step of divesting comprises the step of de-oxidizing the reactant metal particles by bringing said reactant metal particles into frictional contact with one another.

12. The method of claim 10, further comprising the step of separating the active metal particles suspended in the electrolyte and the oxide in the electrolyte.

13. The method of claim 10, further comprising the step of introducing new active metal particles into the electrolyte.

14. A rechargeable battery system comprising:

a battery having a cell case with an input port and an output port, said cell case for holding a liquid electrolyte solution comprised of a suspension of active metal particles having an outer layer of reacted metal oxide;

divester means for receiving said electrolyte solution and for removing at least a portion of said outer layer of said reacted metal oxide on said active metal particles; and means for pumping said electrolyte solution from said output port of said cell case to said divester means and then from said divester means to said input port of said cell case.

15. The rechargeable battery system as set forth in claim 13, wherein said divester means comprise a pair of meshing gears and means for directing said electrolyte solution through said gears, said outer layer of said active metal being removed from said active metal particles as said metal particles pass through said gears.

16. The system of claim 1, wherein said divester means agitates said metal particles.

17. The method of claim 10, wherein the step of divesting comprises a step of de-oxidizing the reactant metal particles by agitating said reactant metal particles.

18. The rechargeable battery system as set forth in claim 14, wherein said divester means comprises a pair of rollers and means for directing said electrolyte through said rollers, said outer layer of said active metal being substantially removed from said active metal particles as said metal particles pass through said rollers.

19. The rechargeable battery system as set forth in claim 14, wherein said divester means agitates said active metal particles in order to at least partially remove said outer layer of said reacted metal oxides from said active metal particles.

* * * * *